United States Patent
Xu et al.

(10) Patent No.: US 8,479,307 B1
(45) Date of Patent: Jul. 2, 2013

(54) SOFTWARE DEACTIVATION BASED ON A DEACTIVATION TIME PERIOD

(75) Inventors: Xuejun Xu, Cupertino, CA (US); Katherine Koch Nadell, Sunnyvale, CA (US); Li-qian Liu, Saratoga, CA (US); Nobuo Griffin, San Francisco, CA (US); Vivek Misra, San Jose, CA (US); Shyam Sunder Vijay, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 74 days.

(21) Appl. No.: 13/010,851

(22) Filed: Jan. 21, 2011

Related U.S. Application Data (62) Division of application No. 11/141,128, filed on May 31, 2005, now Pat. No. 7,900,246.

(51) Int. Cl.
*H04L 29/06* (2006.01)

(52) U.S. Cl.
USPC .......................................................... 726/33

(58) Field of Classification Search
USPC ................................. 726/33, 26, 31; 713/187
See application file for complete search history.

(56) References Cited

U.S. PATENT DOCUMENTS

| | | | | |
|---|---|---|---|---|
| 4,937,863 | A * | 6/1990 | Robert et al. .................. | 710/200 |
| 2004/0039916 | A1 * | 2/2004 | Aldis et al. ..................... | 713/177 |
| 2004/0044901 | A1 * | 3/2004 | Serkowski et al. ............ | 713/200 |
| 2005/0289072 | A1 * | 12/2005 | Sabharwal ....................... | 705/59 |
| 2008/0109549 | A1 | 5/2008 | Nakagawa et al. | |

OTHER PUBLICATIONS

"U.S. Appl. No. 11/141,128, Advisory Action mailed Dec. 21, 2009", 3 pgs.
"U.S. Appl. No. 11/141,128, Final Office Action mailed Jul. 28, 2010", 2 pgs.
"U.S. Appl. No. 11/141,128, Final Office Action mailed Oct. 9, 2009", 9 pgs.
"U.S. Appl. No. 11/141,128, Non-Final Office Action mailed Feb. 19, 2010", 13 pgs.
"U.S. Appl. No. 11/141,128, Non-Final Office Action mailed May 28, 2009", 3 pgs.
"U.S. Appl. No. 11/141,128, Notice of Allowance mailed Oct. 14, 2010", 5 pgs.
"U.S. Appl. No. 11/141,128, Response filed Jan. 20, 2010 to Advisory Action mailed Dec. 21, 2009", 9 pgs.
"U.S. Appl. No. 11/141,128, Response filed Mar. 13, 2009 to Restriction Requirement mailed Feb. 13, 2009", 6 pgs.
"U.S. Appl. No. 11/141,128, Response filed May 19, 2010 to Non-Final Office Action mailed Feb. 19, 2010", 9 pgs.
"U.S. Appl. No. 11/141,128, Response filed Aug. 17, 2009 to Non-Final Office Action mailed May 28, 2009", 10 pgs.
"U.S. Appl. No. 11/141,128, Response filed Sep. 28, 2010 to Final Office Action mailed Jul. 28, 2010", 8 pgs.

(Continued)

*Primary Examiner* — Jason Gee
(74) *Attorney, Agent, or Firm* — Schwegman Lundberg Woessner P.A.

(57) ABSTRACT

A method, an apparatus and a system perform software deactivation based on a deactivation time period. In some embodiments, a method includes receiving a communication from a first client machine to deactivate a license of a software product that was previously activated on the first client machine. The method also includes determining a specified time period of deactivation. The method includes deactivating the license of the software product from the first client machine responsive to a determination that the license was previously activated on the first client machine during the specified time period of deactivation.

12 Claims, 8 Drawing Sheets

OTHER PUBLICATIONS

"U.S. Appl. No. 11/141,128, Response filed Dec. 8, 2009 to Final Office Action mailed Oct. 9, 2009", 8 pgs.

"U.S. Appl. No. 11/141,128, Restriction Requirement mailed Feb. 13, 2009", 6 pgs.

* cited by examiner

SOFTWARE DEACTIVATION BASED ON A DEACTIVATION TIME PERIOD

CROSS-REFERENCE TO RELATED APPLICATIONS

This application is a Divisional of U.S. application Ser. No. 11/141,128, filed on May 31, 2005, the benefit of priority of which is claimed herein, and which is incorporated herein by reference in its entirety.

TECHNICAL FIELD

The application relates generally to data processing, and, more particularly, to deactivation of software.

BACKGROUND

Upgrades to hardware may not always keep pace with upgrades to software and vice versa. Customers may upgrade their hardware at a rate that may outpace the upgrades to their software. Accordingly, customers may attempt to transfer their software on existing hardware to their upgraded hardware. However, allowing the ability to transfer should not allow massive distribution of a single copy of software across a number of different machines.

SUMMARY

According to some embodiments, a method, an apparatus and a system perform software deactivation based on a deactivation time period. In some embodiments, a method includes receiving a communication from a first client machine to deactivate a license of a software product that was previously activated on the first client machine. The method also includes determining a specified time period of deactivation. The method includes deactivating the license of the software product from the first client machine responsive to a determination that the license was previously activated on the first client machine during the specified time period of deactivation.

In some embodiments, a method includes receiving a communication from a first apparatus to deactivate a license of a software product that is activated on the first apparatus. The communication comprises an identification of the first apparatus. The method also includes determining a deactivation time period that includes a predetermined time period in the past up to and including a current time. The method includes performing a deactivation responsive to a determination that the identification of the first apparatus has been activated within the deactivation time period.

In some embodiments, a method includes receiving a communication to deactivate a software product from an apparatus, which is initiated by an uninstallation of the software product from the apparatus. The method includes deactivating a license of the software product for the apparatus based on the communication, responsive to a determination that the license was activated on the apparatus during a deactivation time period.

In some embodiments, a method includes receiving a communication from a client machine to deactivate a license of a first copy of a software product that is activated on a client machine based on installation of a software suite that includes a second copy of the software product on the client machine. The method also includes deactivating the license of the first copy of the software product for the client machine based on the communication.

In some embodiments, an apparatus includes a machine-readable medium to store a deactivation data structure that is associated with a license of a software product. The deactivation data structure is to store identifications of a number of client devices on which the license is activated within a time period that is between a time point in the past and a current time. The apparatus also includes a deactivation module to receive a communication from a current client device to deactivate the license of the software product, wherein the deactivation module is to perform a deactivation upon determining that an identification of the current client device is one of the identifications of the number of client devices on which the license is activated within the time period.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1A. However, reference numbers are the same for those elements that are the same across different Figures. In the drawings.

DETAILED DESCRIPTION

Methods, apparatus and systems for software deactivation based on a deactivation time period are described. In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration.

In some embodiments, copies of software products or a suite of software products may include a limited license based on a serial number. In other words, a copy of a software product may not be activated on an unlimited number of machines. A suite of software products may include one or more software products. While a copy of a software product or suite of software may be installed on any of a number of machines, in some embodiments, the copy of a software product or suite of software may only be activated on a limited number of machines. An activation may require communication with a server over a network prior to execution of the software. The activation may be based on a serial number and other data that uniquely identifies the machine (such as a machine disk identifier (MDI) that uniquely identifies a hard disk drive of the machine on which the software is activated). In some embodiments, an activation may be transferred to different machines. For example, if customers purchase a new machine, the customers may transfer the activation from an old machine to this new one.

Some embodiments incorporate a deactivation time period in the deactivation and activation of a copy of a software product. For example, the deactivation time period may be a window of time starting from the present and looking back a given period (e.g., three months, six months, 12 months, etc.). For a six-month deactivation time period, if an activation or deactivation occurs on July 1, the deactivation time period is from July 1 back to January 1 of the same year. In some embodiments, the limited activations are relative to the deactivation time period. For example, if two activations are allowed for a given software product, two activations are available in the deactivation time period. The given software product may have more activations beyond the deactivation time period. Such embodiments provide a trade-off between limiting the number of activations versus the processing of a large amount of customer service calls regarding the activation.

For example, assume that two activations are allowed for a given copy of a software product and that there is a six-month deactivation time period. After purchasing a copy of a software product, a user typically attempts to install the copy on a first machine and on a second machine, which is allowed. Shortly thereafter, if the user attempts to install the copy on a third machine, the activation is denied. If the user attempts to install the copy on a third machine eight months later, it is assumed that the user has upgraded their hardware because of the length of time. In other words, it is assumed the copy of the software product is actually only being executed on two machines because of this upgrade. Therefore, the third activation is allowed because the first or both the first and second activations are outside the deactivation time period. Accordingly, activations beyond the limited number are allowed outside the deactivation time period in exchange for a reduction in the number of customer service calls. In other words, activations only occur inside the deactivation time period. Any activations that occurred beyond the deactivation time period are now outside this time period.

Figure 1A:
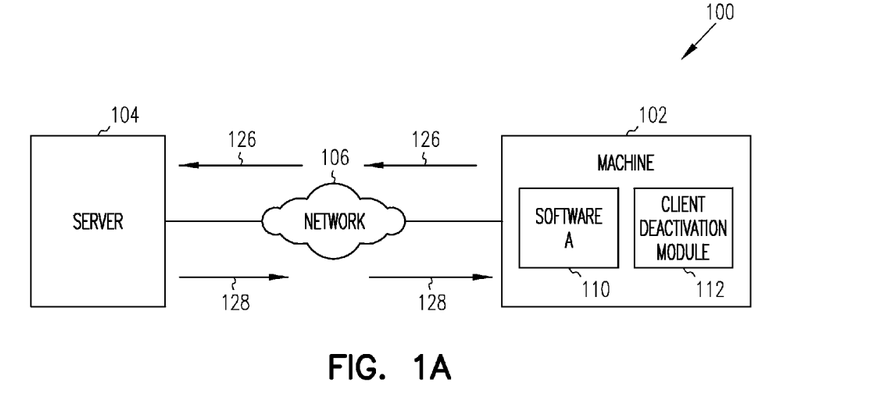
FIG. 1A illustrates a system for software deactivation based on a deactivation time period, according to some embodiments of the invention.

FIG. 1A illustrates a system for software deactivation based on a deactivation time period, according to some embodiments of the invention. In particular, FIG. 1 illustrates a system 100 that includes a machine 102 that is coupled to a server 104 through a network 106. The machine 102 may be representative of any apparatus, computer device, etc. For example, the machine 102 may be a desktop computer, notebook computer, Personal Digital Assistant (PDA), a cellular telephone, etc. The machine 102 includes a software product A 110 that has been installed and activated thereon. The machine 102 also includes a client deactivation module 112. The client deactivation module 112 may be representative of software, hardware, firmware or a combination thereof. For example, the client deactivation module 112 may be software to be executed on a processor (not shown). An example of the machine 102 having this architecture is described in FIG. 5 below.

A more detailed description of an architecture of the machine 102 and/or the server 104, according to some embodiments, is set forth below. While FIG. 1 employs a client-server architecture, embodiments are not limited to such an architecture. For example, some embodiments may be incorporated into a distributed or peer-to-peer architecture system. The network 106 may be different types of networks including a Local Area Network, Wide Area Network, etc. For example, the network 106 may be the Internet, an Intranet network, an Ethernet-based network, etc.

FIG. 1 also includes a number of operations that may be part of the transfer deactivation of the software product A 110. The operations include a deactivation operation 126 and a deactivation result operation 128. The deactivation operation 126 is an operation to deactivate the software product A 110 on the machine 102. In some embodiments, the deactivation operation 126 may be based on a user of the machine 102 attempting to deactivate the software product A 110. For example, the user may determine to perform this deactivation so that the same copy of the software product A 110 may be installed on a different machine. In some embodiments, a copy of the software product A 110 may only be activated on a limited number of machines. Activation and deactivation of software products on machines are performed based on communications with the server 104. As further described below, logic within the server 104 limits the number of activations for a copy of a software product using a serial number of the software and a unique identification of the machines. The logic within the server 104 accepts or denies activation of a copy of a software product based on the number of activations in a given deactivation time period. A deactivation time period is a time window that includes the present time and extends backward to the past a given time period.

The logic within the server 104 receives the deactivation operation 126 and determines whether to perform the deactivation of the software product A 110. The result of this determination is the deactivation result operation 128. In particular, the logic within the server 104 returns a result of the deactivation back to the machine 102. In some embodiments, the result may be an acceptance or denial of the attempt to perform the transfer deactivation.

Figure 1B:
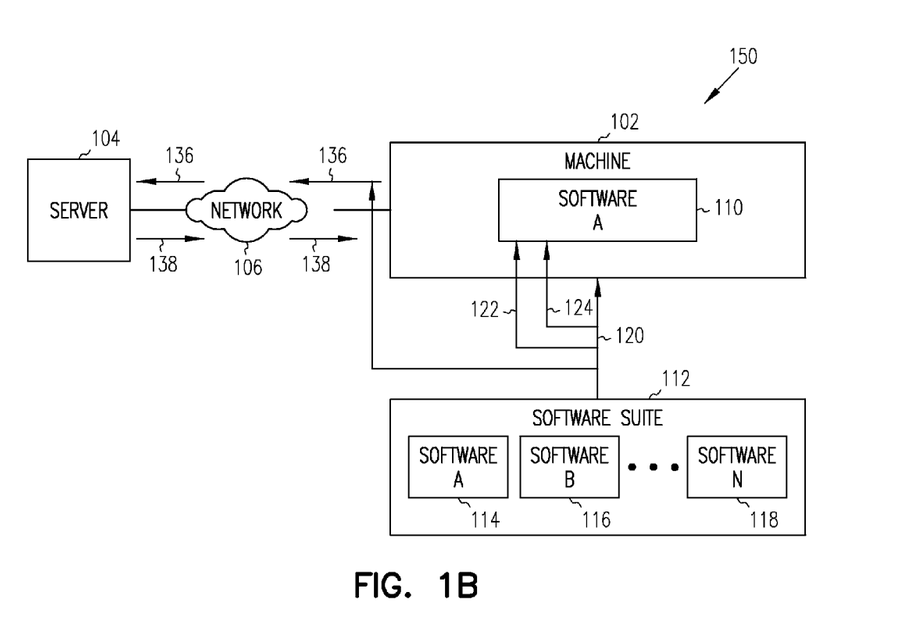
FIG. 1B illustrates a system for software deactivation that is part of a software suite activation based on a deactivation time period, according to some embodiments of the invention.

FIG. 1B illustrates a system for software deactivation that is part of a software suite activation based on a deactivation time period, according to some embodiments of the invention. In particular, FIG. 1 illustrates a system 150 that includes the machine 102 that is coupled to the server 104 through the network 106. The machine 102 includes the software product A 110 that has been installed and activated thereon.

FIG. 1B also includes a number of operations that may be part of the activation of a software suite 112. The operations include an installation of suite operation 120, a serial number change operation 122, a license redirect operation 124 and a deactivation operation 136. As shown, a software suite 112 is being installed on the machine 102 (the installation of suite operation 120). In some embodiments, the activation of the software suite 112 may be part of an installation of the software suite 112 on the machine 102. The software suite 112 may be installed based on a CD-ROM (Compact Disk-Read Only Memory) disk through an input/output (I/O) device, based on a download from a server over the network 106, etc. In some embodiments, the software suite 112 may have already been installed. Therefore, the activation is separate from the installation of the software suite 112.

As shown, the installation of suite operation 120 may cause three other operations—the deactivation operation 136, the serial number change operation 122 and the license redirect operation 124. With regard to the deactivation operation 136, the installation of the software suite 112 may cause the software A product 110 to be deactivated. This deactivation may include communications with the server 104. The logic within the server 104 receives the deactivation operation 136 and determines whether to perform the deactivation of the software product A 110. The result of this determination is the deactivation result operation 138. In particular, the logic within the server 104 returns a result of the deactivation back to the machine 102. In some embodiments, the result may be an acceptance or denial of the attempt to perform the transfer deactivation.

With regard to the serial number change operation 122, the installation of the software suite 112 may cause a serial number of the software A product 110 to be changed to a serial number of the software suite 112. In particular, the serial number for the software A product 110 may be stored within files stored on a machine-readable medium (not shown) of the machine 102. With regard to the license redirection operation 124, the installation of the software suite 112 may cause any operations on the license of the software A product 110 to be redirected to be performed for the license of the software suite 112. Moreover, any operation on the license of the software suite 112 is also performed on the license of the software product A. Therefore, if the license of the software suite 112 is deactivated, transferred, etc., the same operation is performed for the license of the software A product 110.

Figure 2:
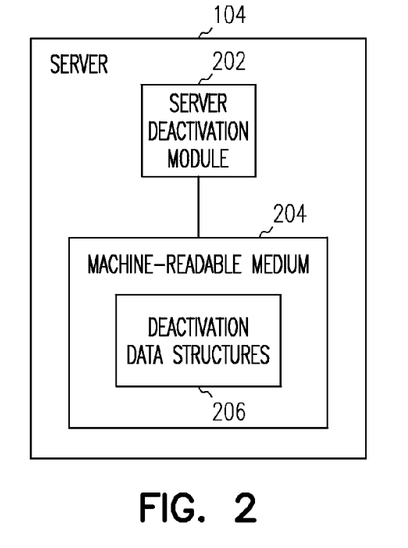
FIG. 2 illustrates a more detailed block diagram of a server that includes software deactivation based on a deactivation time period, according to some embodiments of the invention.

FIG. 2 illustrates a more detailed block diagram of a server that includes software deactivation based on a deactivation time period, according to some embodiments of the invention. In particular, FIG. 2 illustrates a more detailed block diagram of the server 104 of FIGS. 1A-1B. As shown, the server 104 includes a server deactivation module 202 and a machine-readable medium 204. The machine-readable medium 204 stores deactivation data structures 206. The deactivation data structures 206 may be tables, objects, data arrays, etc. The server deactivation module 202 may be representative of software, hardware, firmware or a combination thereof. For example, the server deactivation module 202 may be software to be executed on a processor (not shown). An example of the server 104 having this architecture is described in FIG. 9 below.

The server deactivation module 202 may track activations/deactivations based on a unique identification of the machine or a component therein. For example, in some embodiments, the unique identification may be a machine disk identifier. The machine disk identifier is a value that is calculated based on information related to the hard disk drive (e.g., identifications of sectors or tracks of the hard disk drive). The server deactivation module 202 may also track activations/deactivations based on an identification of a processor of the machine, the amount of memory, etc. In some embodiments, the server deactivation module 202 may also track activations/deactivations based on any combination of those identifications listed above. The server deactivation module 202 may store these unique identifications along with a unique serial number for the license of the software product into the deactivation data structures 206.

Figure 3:
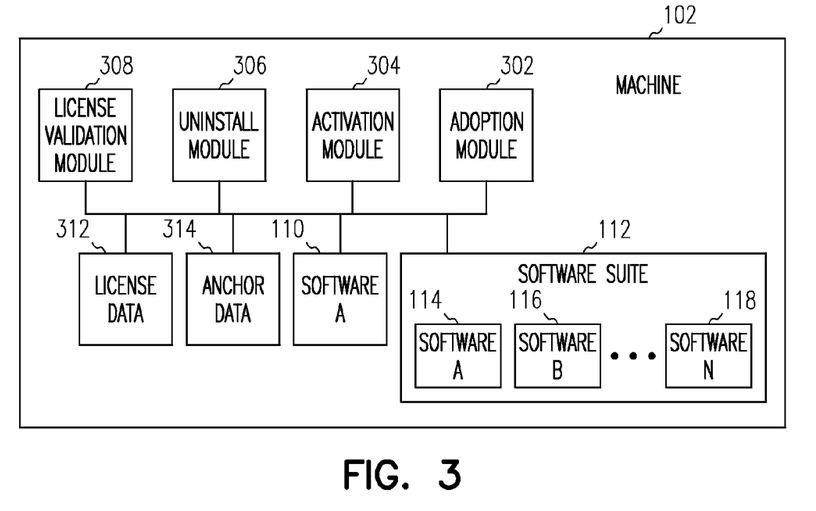
FIG. 3 illustrates a more detailed block diagram of a machine on which a software suite is activated, according to some embodiments of the invention.

FIG. 3 illustrates a more detailed block diagram of a machine on which a software suite is activated, according to some embodiments of the invention. In particular, FIG. 3 illustrates a more detailed block diagram of the machine 102 of FIG. 1. As shown, the machine 102 includes installed copies of the software product A 110 and the software suite 112. The machine also includes an adoption module 302, an activation module 304 and an uninstall module 306, a license validation module 308. The adoption module 302, the activation module 304, the uninstall module 306 and the license validation module 308 may be representative of software, hardware, firmware or a combination thereof. For example, the adoption module 302, the activation module 304, the uninstall module 306 and the license validation module 308 may be software to be executed on a processor (not shown). An example of the machine 102 having this architecture is described in FIG. 9 below. Subsequent to activation, the software product A 110 and the software product A 114, the software product B 116 and the software product N 118 may also execute on a similar processor.

Figure 4:
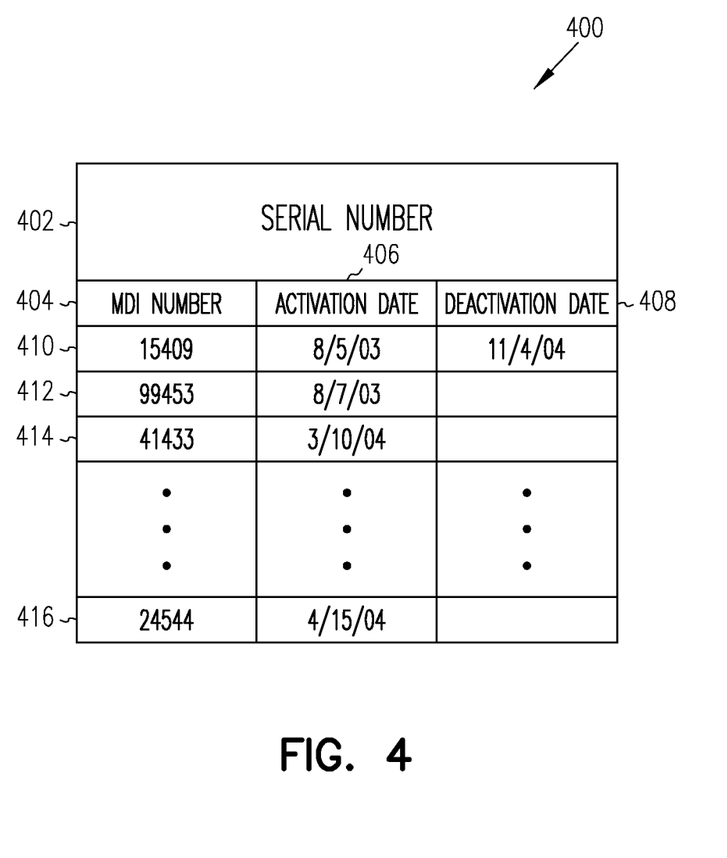
FIG. 4 illustrates a deactivation data structure for software deactivation, according to some embodiments of the invention.

FIG. 4 illustrates a deactivation data structure for software deactivation, according to some embodiments of the invention. In particular, Figure 4 illustrates a deactivation data structure 400, which may be representative of one of the deactivation data structures 206 (shown in FIG. 2). The deactivation data structure 400 may be uniquely identified based on a serial number of the software product (402). The deactivation data structure 400 may include an MDI number column 404, an activation date column 406 and a deactivation date column 408.

The MDI number column 404 may store the unique identification for a given client device. The activation date column 406 and the deactivation date column 408 may store the activation date and deactivation date, respectively, for a given client device. For example, an entry 410 includes a client device having an MDI number (15409) that was activated on Aug. 5, 2003 and deactivated on Nov. 4, 2004. An entry 412 includes a client device having an MDI number (99453) that was activated on Aug. 7, 2003 and that has not been deactivated. An entry 414 includes a client device having an MDI number (41433) that was activated on Mar. 10, 2004 and that has not been deactivated. An entry 416 includes a client device having an MDI number (24544) that was activated on Apr. 15, 2004 and that has not been deactivated.

Figure 5A:
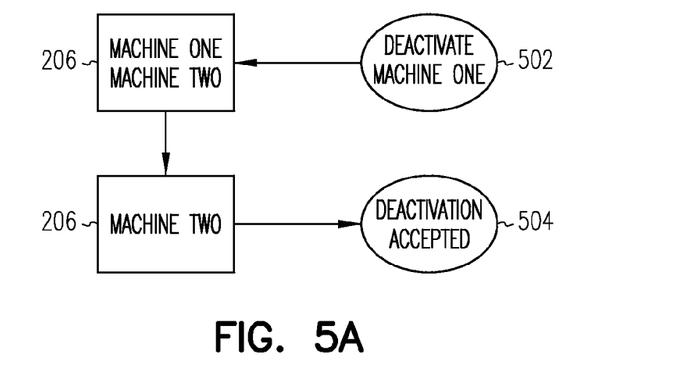
FIGS. 5A-5C illustrate scenarios for attempting to deactivate a machine for different deactivation time periods, according to some embodiments of the invention.
Figure 5B:
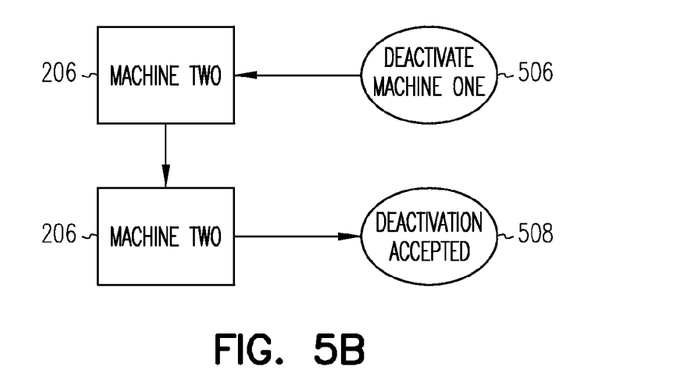
Figure 5C:
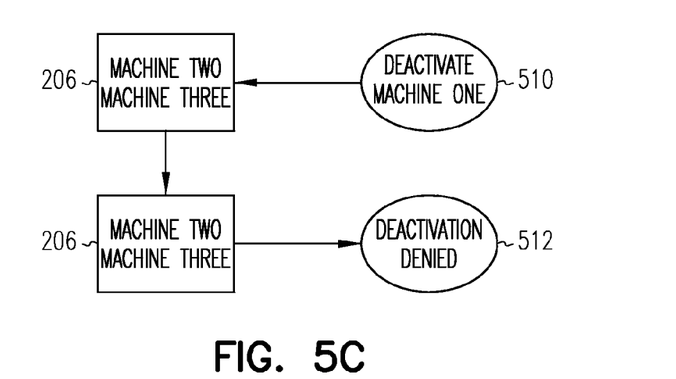

A more detailed description of the operations for software deactivation based on a deactivation time period, according to some embodiments, is now described. FIGS. 5A-5C illustrate scenarios for attempting to deactivate a machine for different deactivation time periods, according to some embodiments of the invention. In particular, FIGS. 5A-5C illustrate a deactivation table that is representative of one of the deactivation data structures 206 (shown in FIG. 2). Moreover, FIGS. 5A-5C illustrate input/output messages from the server 104. For FIGS. 5A-5C, a maximum number of machines to be activated for the software product A 110 equals two for a given deactivation time period.

FIG. 5A illustrates a scenario wherein the machine on which the software is attempting to be deactivated has been activated within the deactivation time period. Machine one is attempting to be deactivated (deactivate machine one message 502). Machine one may transmit this message that is received by the server deactivation module 202. FIG. 5A also illustrates the deactivation table 206 for the software product A 110 attempting to be deactivated. The deactivation table 206 illustrates that machine one and machine two were activated in the current deactivation time period. Accordingly, the machine on which the software is attempting to be deactivated (machine one) is within the deactivation time period. The server deactivation module 202 deletes machine one from the deactivation time period. The server deactivation module 202 also transmits a message back to machine one indicating that the deactivation was accepted (deactivation accepted 504).

FIG. 5B illustrates a scenario wherein the machine on which the software is attempting to be deactivated was not activated within the deactivation time period. For this scenario, the current number of machines in the deactivation time period is less than the maximum number allowed for the software. Machine one is attempting to be deactivated (deactivate machine one message 506). Machine one may transmit this message that is received by the server deactivation module 202. FIG. 5B also illustrates the deactivation table 206 for the software product A 110 attempting to be deactivated. The deactivation table 206 illustrates that machine two was activated in the current deactivation time period. Accordingly, the machine on which the software is attempting to be deactivated (machine one) is not within the deactivation time period. Because the machine one is not within the deactivation time period, the server deactivation module 202 does not update the deactivation table 206 to reflect an update in the deactivation time period. However, because the number of activations in the deactivation time period is less than the maximum number of allowed activations, the server deactivation module 202 transmits a message back to machine one indicating that the deactivation was accepted (deactivation accepted 508). Such a message represents to the user of machine one that the copy of the software product may be activated on a different machine.

FIG. 5C illustrates a scenario wherein the machine on which the software is attempting to be deactivated was not activated within the deactivation time period. For this scenario, the current number of machines in the deactivation time period is equal to the maximum number allowed for the software. Machine one is attempting to be deactivated (deactivate machine one message 506). Machine one may transmit this message that is received by the server deactivation module 202. FIG. 5C also illustrates the deactivation table 206 for the software product A 110 attempting to be deactivated. The deactivation table 206 illustrates that machine two and machine three were activated in the current deactivation time period. Accordingly, the machine on which the software is attempting to be deactivated (machine one) is not within the deactivation time period. The server deactivation module 202 denies the deactivation because the machine is not within the deactivation time period and the number of machines in the deactivation time period is at the maximum number allowed. Because the deactivation was not accepted, the server deactivation module 202 does not update the deactivation table 206 to reflect an update in the deactivation time period. The server deactivation module 202 also transmits a message back to machine one indicating that the deactivation was denied (deactivation denied 512).

Figure 6:
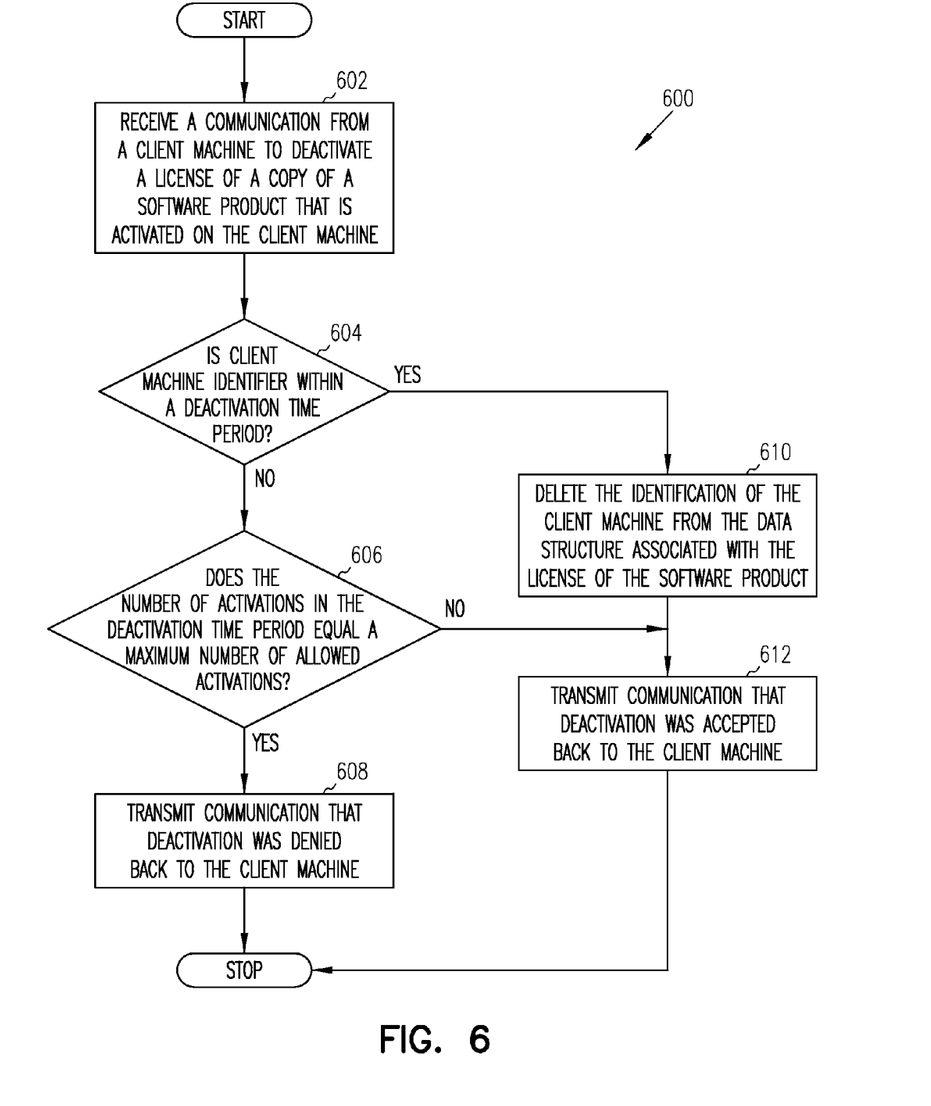
FIG. 6 illustrates a flow diagram for software deactivation based on a deactivation time period, according to some embodiments of the invention.

A more detailed description of the operations for deactivation of a software application based on a deactivation time period, according to some embodiments, is now described. In particular, FIG. 6 illustrates a flow diagram for software deactivation based on a deactivation time period, according to some embodiments of the invention. The flow diagram 600 illustrates the operations for deactivating software on a machine. The flow diagram 600 is described with reference to the components of FIGS. 1A, 1B, 2 and 3. The flow diagram 600 commences at block 602.

At block 602, the server deactivation module 202 of the server 104 receives a communication from a client machine to deactivate a license of a software product that is activated on the client machine. With reference to FIG. 1, the machine 102 may transmit a communication to the server 104 that initiates the deactivation operation 126. The sever deactivation module 202 receives this communication. The flow continues at block 604.

At block 604, the server deactivation module 202 determines whether the identification of the client machine is within a deactivation time period. The server deactivation module 202 may retrieve the deactivation data structure 206 that is associated with the license of the software product attempting to be deactivated. The server deactivation module 202 may determine the deactivation time period based on the current day. For example, if the period of the deactivation time period is six months, the server deactivation module 202 may define that deactivation time period as the last six months starting from the current day. Therefore, the definition of the deactivation time period is a dynamic time period that is dependent on the time in which an activation/deactivation is to be performed.

In some embodiments, the deactivation data structure 206 may store the history of all activations and deactivations for the particular license. As described above, in some embodiments, a limited number of activations for a license is available within a given deactivation time period. Based on the history stored in the deactivation data structure 206, the server deactivation module 202 may determine whether the identification of the current client machine requesting deactivation is activated for the deactivation time period. Upon determining that the identification of the client machine is within the deactivation time period, control continues at block 610, which is described in more detail below. Upon determining that the identification of the client machine is not within the deactivation time period, control continues at block 606.

At block 606, the server deactivation module 202 determines whether the number of activations in the deactivation time period equals a maximum number of allowed activations. As described above, the deactivation data structure 206 that is associated with the license of the software product attempting to be deactivated may store this number of activations in the deactivation time period. The maximum number of allowed activations may be any value and may be set by the developers and publishers of the software. Therefore, this maximum number may vary based on the type of software. This maximum number may also vary for a same software product, depending on the license received. Upon determining that the number of activations in the deactivation time period does not equal the maximum number of allowed activations, control continues at block 612, which is described in more detail below. Upon determining that the number of activations in the deactivation time period does equal the maximum number of allowed activations, control continues at block 608.

At block 608, the server deactivation module 202 transmits a communication that the deactivation was denied back to the client machine. This scenario is illustrated in FIG. 5C (shown above). The machine attempting to be deactivated is not one of the machines in the deactivation time period. Also, the number of machines activated in the deactivation time period is equal to the maximum number of allowed activations for this license. The operations of the flow diagram 600 are complete.

At block 610, the server deactivation module 202 deletes the identification of the client machine from the data structure associated with the license of this software product. In particular, because the identification of the client machine is within the deactivation time period, the server deactivation module 202 is accepting the attempt to deactivate the license on this particular client machine. This scenario is illustrated in FIG. 5A (shown above). Control continues at block 612.

At block 612, the server deactivation module 202 transmits a communication that the deactivation was accepted back to the client machine. Accordingly, the license of the software that was deactivated may now be activated on a different client machine.

Also, the operations of block 612 may occur after the operations of block 606. Specifically, even if the identification of the client machine is not within the deactivation time period, the server deactivation module 202 may transmit this communication back to the client machine indicating acceptance. As shown, this may occur if the number of activations in the deactivation time period is less than the maximum number of allowed activations for this license. Therefore, through this path in the flow diagram 600, there are no updates to the deactivation data structure 206. However, the server deactivation module 202 still transmits a communication back to the client machine indicating that the deactivation was accepted. This scenario is illustrated in FIG. 5B (shown above). Accordingly, the license of the software that was attempting to be deactivated may now be activated on a different client machine. The operations of the flow diagram 600 are complete.

Figure 7:
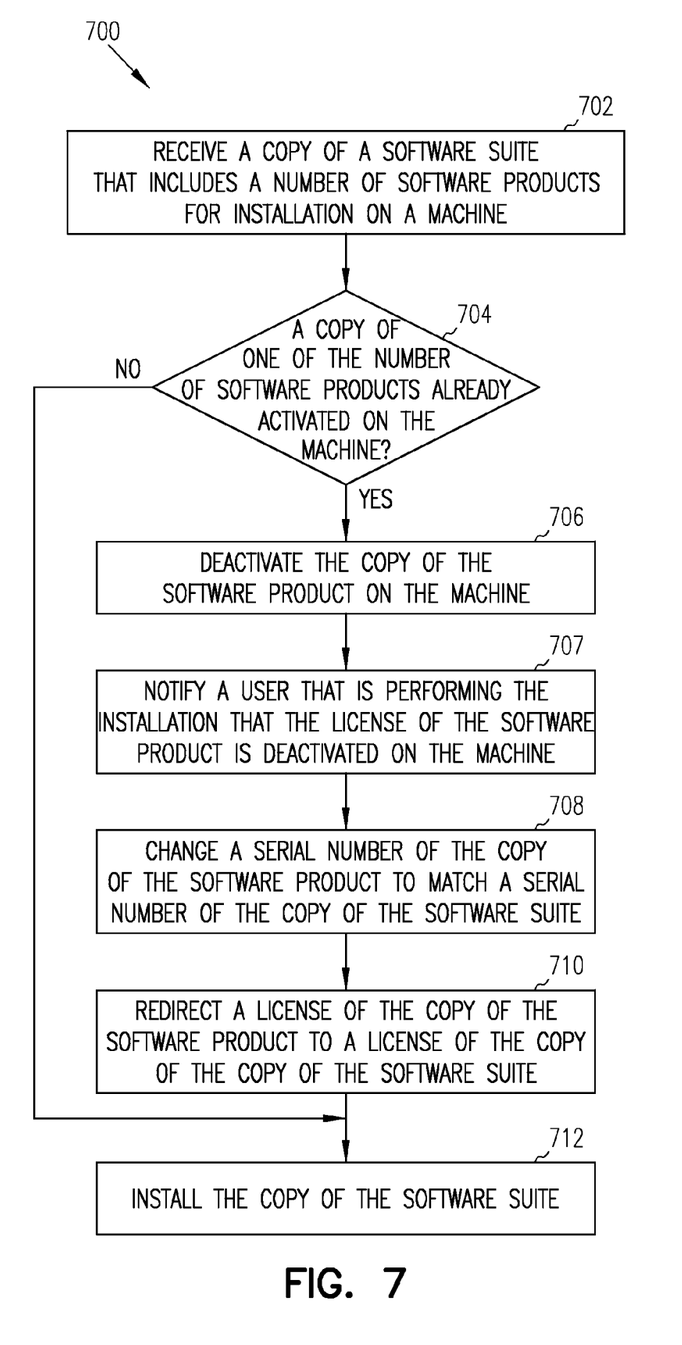
FIG. 7 illustrates a flow diagram for software suite activation that may include deactivation of a software application, according to some embodiments of the invention.

A more detailed description of the operations for deactivation of a software application that is part of a software suite activation based on a deactivation time period, according to some embodiments, is now described. FIG. 7 illustrates a flow diagram for software suite activation that may include deactivation of a software application, according to some embodiments of the invention. The flow diagram 700 illustrates the operations for activating a software suite having a number of individual software products on a machine. Moreover, such operations are described wherein a copy of one of the individual software products is already activated on the machine. Such operations may be performed for a greater number of activated individual software products. The flow diagram 700 is described with reference to the components of FIGS. 1A, 1B, 2 and 3. The flow diagram 700 commences at block 702.

Figure 9:
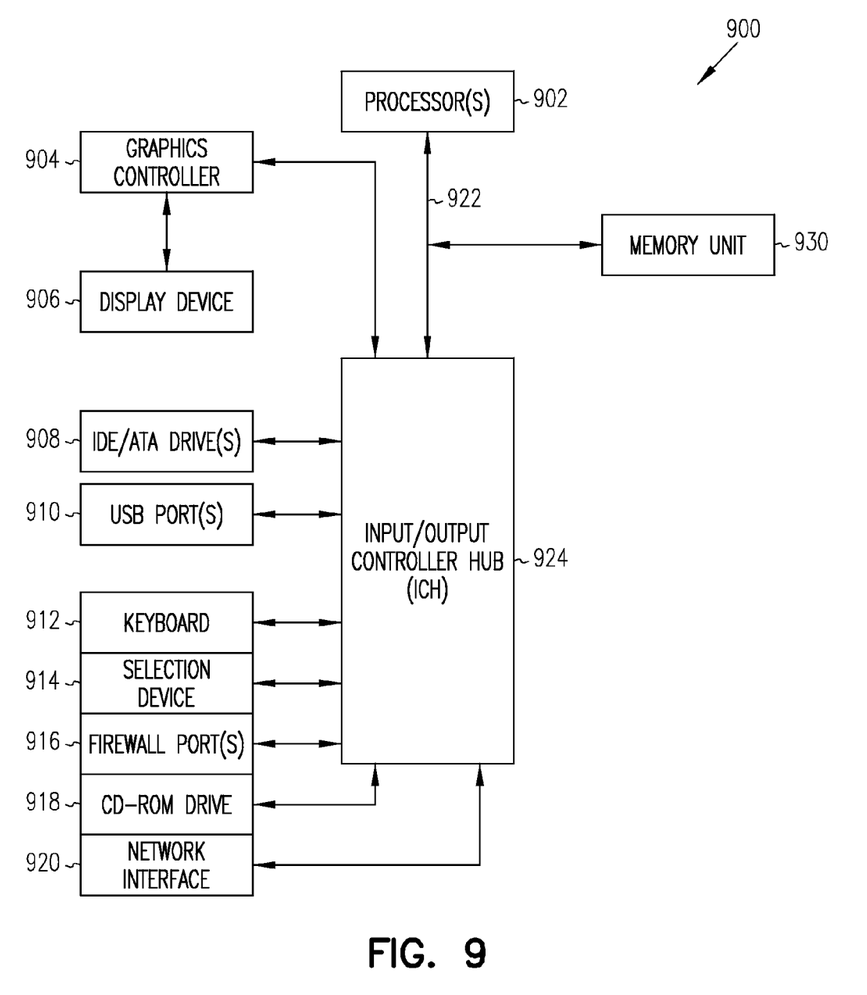
FIG. 9 illustrates a computer device that executes software for performing operations related to software deactivation based on a deactivation time period, according to some embodiments of the invention.

At block 702, the activation module 304 of a machine may receive a copy of a software suite (that includes a number of software products) for installation on the machine. With reference to FIGS. 1A and 3, the machine 102 may include an I/O module for receiving the copy of the software suite 112 for installation. Examples of different I/O module are shown in FIG. 9 that is described below. The flow continues at block 704.

At block 704, the adoption module 302 determines whether a copy of one of the number of software products is already activated on the machine. In some embodiments, the adoption module 302 may make this determination based on the existence of a file stored on the hard disk drive of the machine 102, the setting of a flag in a file that is part of the installation of the software product, etc. In some embodiments, the adoption module 302 may make this determination based on a query to the server deactivation module 202 on the server 104 over the network 106. Upon determining that a copy of one of the number of software products is not already activated on the machine 102, the flow continues at block 712, which is described in more detail below.

At block 706, upon determining that a copy of one of the number of software products is already activated on the machine 102, the activation module 304 deactivates the copy of the software product on the machine 102. With reference to FIGS. 1B and 3, the activation module 304 communicates a deactivation message (deactivation operation 136) to the server 104. The server deactivation module 202 of the server 104 may deactivate the license of the copy of the software product A 110 for the machine 102. For example, the server deactivation module 202 may update a table in the deactivation data structures 206 (as described above). Accordingly, even if the license of copy of the software product A 110 has a limited number of activations, the copy may be activated on a different machine.

In some embodiments, the operations shown in the flow diagram 400 of FIG. 4 are executed as part of the deactivation. Accordingly, the deactivation may be based on a deactivation time period. Therefore, the individual copy of the software products is not adopted by the software suite prior to deactivation, thereby allowing for reuse of the license of the software product A 110. The flow continues at block 707.

At block 707, the adoption module 302 notifies a user that is performing the installation of the software suite that the license of the software product A 110 is now deactivated on the machine 102. The adoption module 302 may also notify the user that the license is now available for use on a different machine. This notification may be through a pop-message during the activation, an email message, a telephone call, etc. If the operations of the flow diagram 400 are executed as part of the operation in block 706, the notification may include acceptance or denial of the deactivation based on the deactivation time period (as described above). The flow continues at block 708.

At block 708, the adoption module 302 changes a serial number of the copy of the software product A 110 to a match a serial number of the copy of the software suite. With reference to FIGS. 1B and 3, the serial numbers may be stored in one or more locations in files in storage on the machine 102. Accordingly, the adoption module 302 updates the serial number in those locations. The flow continues at block 710.

At block 710, the adoption module 302 redirects a license of the copy of the software product A 110 to a license of the copy of the software suite. With reference to FIGS. 1B and 3, the adoption module 302 may perform this redirection based on creation of a file, setting a flag in a file, etc. Therefore, if a change is to occur to a license of the software suite 112, the same change will be made to the license of the copy of the software A product 110 and vice versa. Logic that is to make changes to the license may be updated accordingly. For example, if the license of the software suite 112 is to be transferred to a different machine, to be deactivated, etc., the logic to perform this operation may check for the existence of a certain file. Upon determining that this file exists, the logic may perform the same operation to the license of the software A product 110. The flow continues at block 712.

At block 712, the activation module 304 activates the copy of the software suite. With reference to FIGS. 1B and 3, the activation module 304 may activate the copy of the software suite 112 by sending an activation message to the server 104. Logic within the server 104 may determine whether the copy of the software suite 112 may be activated. For example, the logic within the server 104 may include activation counters for the different copies of the software suites that are tracked based on serial numbers. Therefore, if the copy of the software suite 112 has already been activated for a set limit, the logic within the server 104 may deny activation and transmit a deny message back to the machine 102. If the copy of the software suite 112 is below the set limit, such logic updates its number of activations for this copy of the software suite and sends an activation message back to the machine 102.

Embodiments are not limited to the operations shown in the flow diagram 700. For example, in some embodiments, the activation of the software suite may cause the adoption of the individual copy of the software product but not cause the deactivation of the individual copy of the software product. Alternatively, in some embodiments, the activation of the software suite may cause the deactivation of the individual copy of the software product, but not cause the adoption of the individual copy of the software product.

Figure 8:
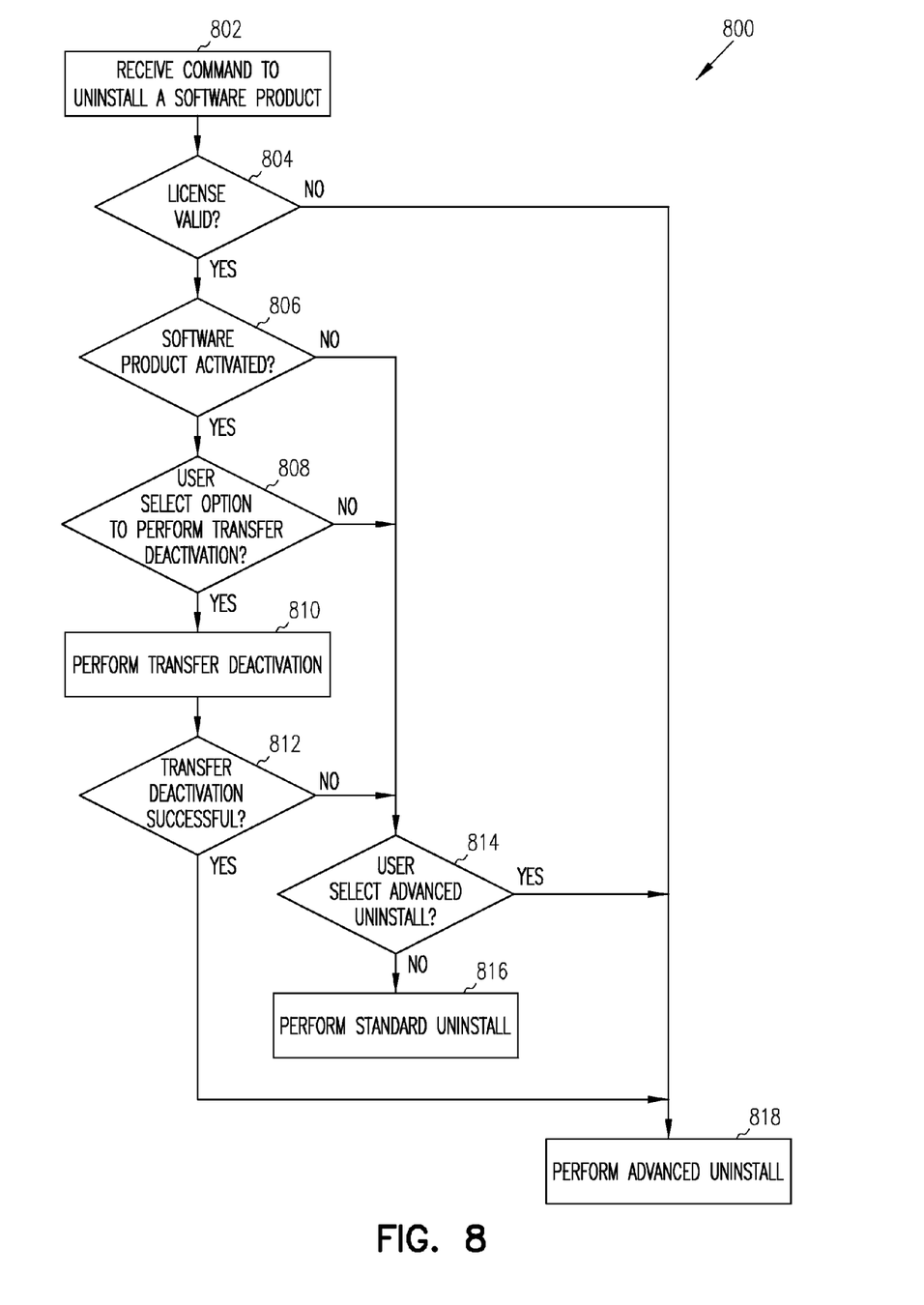
FIG. 8 illustrates a flow diagram for software uninstallation that integrates transfer deactivation, according to some embodiments of the invention.

A more detailed description of the operations of a software uninstallation that includes software deactivation based on a deactivation time period, according to some embodiments, is now described. FIG. 8 illustrates a flow diagram for software uninstallation that integrates transfer deactivation, according to some embodiments of the invention. The flow diagram 800 is described with reference to the components of FIGS. 1A, 1B, 2 and 3. The flow diagram 800 commences at block 802.

At block 802, the uninstall module 306 receives a command to uninstall a software product that is installed on the machine 102. For example, the command may be generated from an uninstall application that is executed by a user of the machine 102 to uninstall the software product A 110. The flow continues at block 804.

At block 804, the license validation module 308 determines whether the license of the software product A 110 is valid. Once the command to uninstall is received, the uninstall module 306 may call the license validation module 308 to perform this determination. The license validation module 308 may make this determination by validating the license data 312. For example, the license validation module 308 may check whether a valid value is stored for the license in the license data 312. Upon determining that the license of the software product A 110 is not valid, the flow continues at block 818, which is described in more detail below. Upon determining that the license of the software product A 110 is valid, the flow continues at block 806.

At block 806, the license validation module 308 determines whether the software product A 110 is activated. In some embodiments, the license validation module 308 determines whether the anchor data 314 includes an indication that the software product A 110 has been activated. In some embodiments, the software product A 110 may be executed on the machine 102 for a trial period without requiring the software to be activated. This may be any predetermined time period (e.g., 30 days) from the time of installation. The data representative of this predetermined time period may be stored in the anchor data 314. Therefore, if the software product A 110 is not activated, the license validation module 308 may check the anchor data 314 if the software product A 110 has been installed within the predetermined time period. In some embodiments, if the software product A 110 is activated or the software product A 110 has been installed within the predetermined time period, the license of the software product A 110 is considered activated. Upon determining that the software product A 110 is not activated, the flow continues at block 814, which is described in more detail below. Upon determining that the software product A 110 is activated, the flow continues at block 808.

At block 808, the uninstall module 306 determines whether the user (that initiated the uninstall) has selected an option to perform a transfer activation of the software product A prior to the uninstall. The uninstall module 306 may cause a Graphical User Interface (GUI) window to be opened on a monitor of the machine 102 that allows the user to make the selection. Upon determining that the user did not select the option to perform the transfer activation, the flow continues at block 814, which is described in more detail below. Upon determining that the user did select the option to perform the transfer activation, the flow continues at block 810.

At block 810, the activation module 304 performs the transfer activation of the software product A 110. The activation module 304 may transmit a communication to the server deactivation module 202 on the server 104. The communication may include the serial number associated with the software product A 110 and the identification of the machine 102. The communication includes an indication that the software product A 110 is to be deactivated for the machine 102. As described above, the server deactivation module 202 may update data structures in a machine-readable medium to reflect this deactivation. The server deactivation module 202 may transmit a communication back to the activation module 304 that is indicative of whether the transfer activation was successful. In some embodiments, the operations shown in the flow diagram 400 of FIG. 4 are executed as part of the deactivation. Accordingly, the deactivation may be based on a deactivation time period. Therefore, the individual copy of the software products is not adopted by the software suite prior to deactivation, thereby allowing for reuse of the license of the software product A 110. The flow continues at block 812.

At block 812, the activation module 304 determines whether the transfer deactivation of the software product A 110 was successful. The activation module 304 may make this determination based on if a successful communication is received back from the server deactivation module 202 of the server 104. The transfer activation may not be successful if the network 106 or the server 104 is not operational, if the data that the server deactivation module 202 is to update is not accessible, corrupted, etc., if the data transmitted over the network is corrupted, etc. Upon determining that the transfer activation was successful, the flow continues at block 818, which is described in more detail below. Upon determining that the transfer activation was not successful, the flow continues at block 814.

At block 814, the uninstall module 306 determines whether the user selected an advanced uninstall of the software product A 110. The uninstall module 306 may cause a GUI window to be opened on a monitor of the machine 102 that allows the user to make the selection. Upon determining that the user did select the advanced uninstall, the flow continues at block 818, which is described in more detail below. Upon determining that the user did not select the advanced uninstall, the flow continues at block 816.

At block 816, the uninstall module 306 performs the standard uninstall of the software product A 110. As part of the standard uninstall, the uninstall module 306 may remove application files, update registry data, etc. However, the uninstall module 306 does not remove the data related to the activation of the copy of the software product A 110 and the anchor data 314. Accordingly, the standard uninstall operation preservers the activation data on the machine, which allows users to reinstall the copy of the software product A 110 without reactivating of the software. A standard uninstall operation may be executed for users who plan on re-installing the software product on the same machine. The flow diagram 800 is then complete.

At block 818, the uninstall module 306 performs the advanced uninstall of the software product A 110. As part of the advanced uninstall, the uninstall module 306 may remove application files, update registry data, etc. In addition, the uninstall module 306 may remove the activation data. In some embodiments, the uninstall module 306 may remove all data and files associated with the software product A, except for the data (stored in the anchor data 314) that indicates that the software has been installed and time of installation. Such data may remain to preclude users from cyclically installing and uninstalling the software to stay within the trial period. Accordingly, the users are required to activate the software. The user may select the advanced uninstall operation if the trial period has expired and the user has not activated the software. The user may also select the advanced uninstall operation if the user has already transferred the activation. The user may select the advanced uninstall operation if the license of the software is corrupt and requires reactivation. The flow diagram 800 is then complete.

An embodiment wherein software performs operations related to the software deactivation based on a deactivation time period as described herein is now described. In particular, FIG. 9 illustrates a computer device that executes software for performing operations related to software deactivation based on a deactivation time period, according to some embodiments of the invention. FIG. 9 illustrates a computer device 900 that may be representative of the machine 102 or the server 104.

As illustrated in FIG. 9, the computer device 900 comprises processor(s) 902. The computer device 900 also includes a memory unit 930, processor bus 922, and Input/Output controller hub (ICH) 924. The processor(s) 902, the memory unit 930, and the ICH 924 are coupled to the processor bus 922. The processor(s) 902 may comprise any suitable processor architecture. The computer device 900 may comprise one, two, three, or more processors, any of which may execute a set of instructions in accordance with embodiments of the invention.

The memory unit 930 may store data and/or instructions, and may comprise any suitable memory, such as a random access memory (DRAM). For example, the memory 930 may be a Synchronous RAM (SRAM), a Synchronous Dynamic RAM (SDRAM), DRAM, a double data rate (DDR) Synchronous Dynamic RAM (SDRAM), etc. The computer device 900 also includes IDE drive(s) 908 and/or other suitable storage devices. A graphics controller 904 controls the display of information on a display device 906, according to some embodiments of the invention.

The input/output controller hub (ICH) 924 provides an interface to I/O devices or peripheral components for the computer device 900. The ICH 924 may comprise any suitable interface controller to provide for any suitable communication link to the processor(s) 902, memory unit 930 and/or to any suitable device or component in communication with the ICH 924. For one embodiment of the invention, the ICH 924 provides suitable arbitration and buffering for each interface.

For some embodiments of the invention, the ICH 924 provides an interface to one or more suitable integrated drive electronics (IDE) drives 908, such as a hard disk drive (HDD) or compact disc read only memory (CD ROM) drive, or to suitable universal serial bus (USB) devices through one or more USB ports 910. For one embodiment, the ICH 924 also provides an interface to a keyboard 912, mouse 914, CD-ROM drive 918, or other suitable devices through one or more firewire ports 916. In some embodiments, the ICH 924 also provides a network interface 920 though which the computer device 900 can communicate with other computers and/or devices. In some embodiments, the ICH 924 is connected to a wireless interface, which enables the computer device 900 to wirelessly connect to computing devices using any suitable wireless communication protocol (e.g., 802.11b, 802.11g, etc.).

In some embodiments, the computer device 900 includes a machine-readable medium that stores a set of instructions (e.g., software) embodying any one, or all, of the methodologies described herein. Furthermore, software can reside, completely or at least partially, within memory unit 930 and/or within the processor(s) 902.

If the computer device 900 is representative of the machine 102, the memory 930 and/or one of the IDE/ATA drives 908 may store the client deactivation module 112, the adoption module 302, the activation module 304, the uninstall module 306, the license validation module 308, the software suite 112, the software product A 110, the anchor data 314 and the license data 312. If the computer device 900 is representative of the server 104, the memory 930 and/or one of the IDE/ATA drives 908 may store the server deactivation module 202 and the deactivation data structures 206. In some embodiments, the client deactivation module 112, the adoption module 302, the activation module 304, the uninstall module 306, the license validation module 308, the software suite 112 and the software product A 110 may be instructions executing within the processor(s) 902. The client deactivation module 112, the adoption module 302, the activation module 304, the uninstall module 306 and the license validation module 308 may be stored in a machine-readable medium that are a set of instructions (e.g., software) embodying any one, or all, of the methodologies described herein.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for software deactivation based on a deactivation time period, in accordance with some embodiments of the invention. A number of flow diagrams illustrate the operations for software deactivation based on a deactivation time period, in accordance with some embodiments of the invention. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   receiving a communication from a first apparatus to deactivate a license of a software product that is activated on the first apparatus, wherein the communication comprises an identification of the first apparatus;
   determining a deactivation time period that includes a predetermined time period in the past up to and including a current time within which at least one activation is allowed for the software product and beyond the predetermined time period the at least one activation being again allowed; and
   performing a deactivation responsive to a determination that the identification of the first apparatus has been activated within the deactivation time period, the performance of the deactivation performed automatically through execution of instructions on at least one processor; and
   in response to an activation request from a second apparatus, executing instructions on the at least one processor to automatically:
      fulfill the activation request with an activation when the second apparatus has not already been activated and either the deactivation time period has expired or an activation of the at least one allowed activation is available; and
      deny the activation when the deactivation time period has not expired and there is not an activation of the at least one allowed activation available.

2. The method of claim 1, further comprising activating a second apparatus responsive to a determination that a number of activations within the deactivation time period is less than a maximum number of activations for the license.

3. The method of claim 1, further comprising denying the deactivation responsive to a determination that the identification has not been activated within the deactivation time period and responsive to a determination that the number of activations within the deactivation time period is equal to a maximum number of activations for the license.

4. The method of claim 3, wherein denying the deactivation comprises transmitting a communication back to the first apparatus that indicates that the deactivation was denied.

5. The method of claim 1, wherein performing the deactivation comprises:
   deleting the identification of the first apparatus from a deactivation data structure associated with the license; and
   transmitting a communication back to the first apparatus that indicates that the deactivation was accepted.

6. The method of claim 1, further comprising transmitting a communication back to the first apparatus that indicates that the deactivation was performed.

7. A non-transitory machine-readable medium that provides instructions which, when executed by a machine, cause said machine to perform operations comprising:
   receiving a communication from a first apparatus to deactivate a license of a software product that is activated on the first apparatus, wherein the communication comprises an identification of the first apparatus;
   determining a deactivation time period that includes a predetermined time period in the past up to and including a current time within which at least one activation is allowed for the software product and beyond the predetermined time period the at least one activation being again allowed; and
   performing a deactivation responsive to a determination that the identification of the first apparatus has been activated within the deactivation time period, the performance of the deactivation performed automatically through execution of instructions on at least one processor; and
   in response to an activation request from a second apparatus, executing instructions on the at least one processor to automatically:
      fulfill the activation request with an activation when the second apparatus has not already been activated and either the deactivation time period has expired or an activation of the at least one allowed activation is available; and
      deny the activation when the deactivation time period has not expired and there is not an activation of the at least one allowed activation available.

8. The non-transitory machine-readable medium of claim 7, further comprising activating a second apparatus responsive to a determination that a number of activations within the deactivation time period is less than a maximum number of activations for the license.

9. The non-transitory machine-readable medium of claim 7, further comprising denying the deactivation responsive to a determination that the identification has not been activated within the deactivation time period and responsive to a determination that the number of activations within the deactivation time period is equal to a maximum number of activations for the license.

10. The non-transitory machine-readable medium of claim 9, wherein denying the deactivation comprises transmitting a communication back to the first apparatus that indicates that the deactivation was denied.

11. The non-transitory machine-readable medium of claim 7, wherein performing the deactivation comprises:
- deleting the identification of the first apparatus from a deactivation data structure associated with the license; and
- transmitting a communication back to the first apparatus that indicates that the deactivation was accepted.

12. The non-transitory machine-readable medium of claim 7, further comprising transmitting a communication back to the first apparatus that indicates that the deactivation was performed.

* * * * *